Feb. 24, 1942.  J. ROGERSON ET AL  2,273,995
LINING OF RUBBER ARTICLES
Filed Nov. 25, 1939
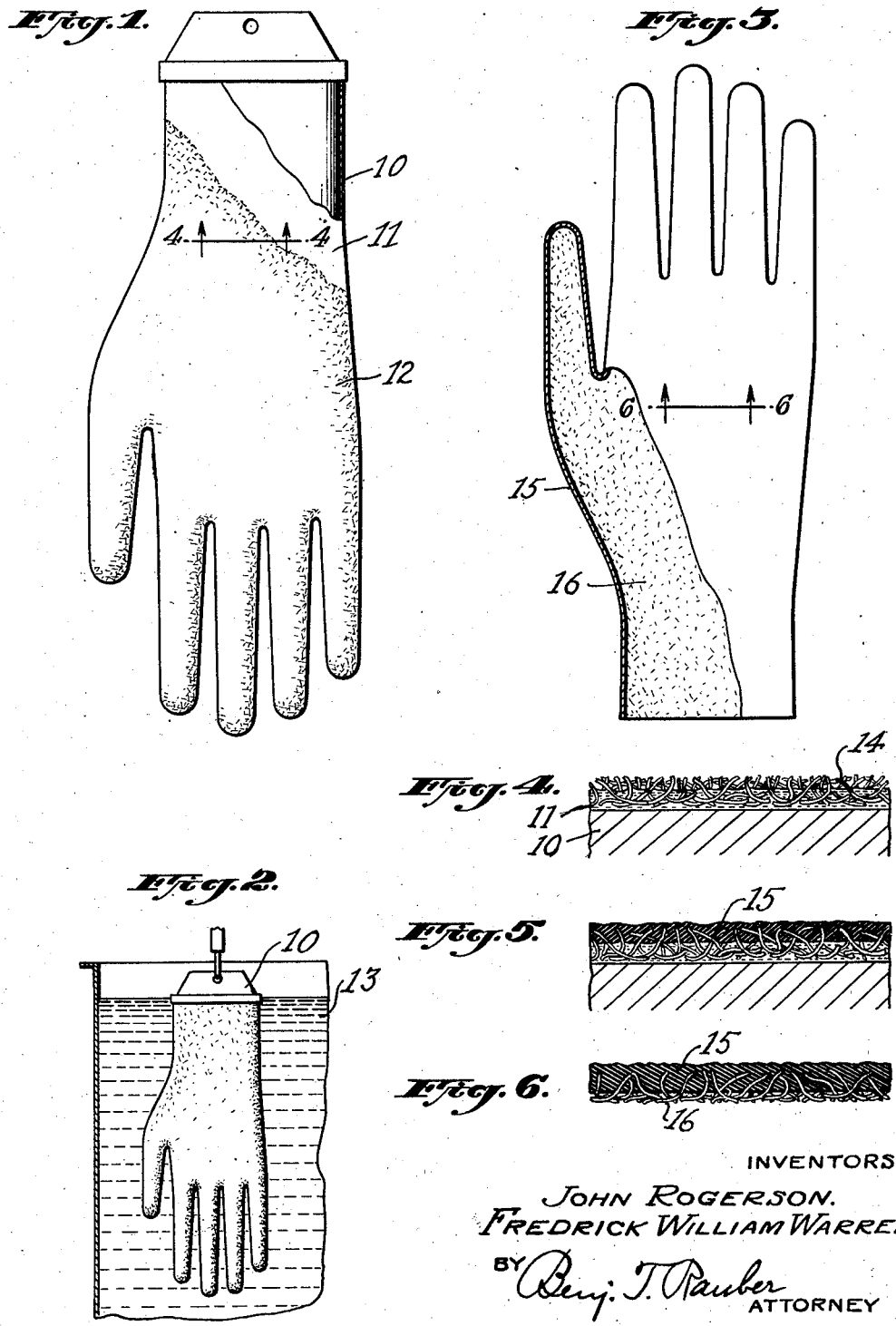
INVENTORS
JOHN ROGERSON.
FREDRICK WILLIAM WARREN.
BY
ATTORNEY Patented Feb. 24, 1942

2,273,995

UNITED STATES PATENT OFFICE 2,273,995

LINING OF RUBBER ARTICLES

John Rogerson and Fredrick William Warren, Manchester, England, assignors to Dunlop Rubber Company Limited, London, England, a British company Application November 25, 1939, Serial No. 306,081
In Great Britain December 13, 1938

8 Claims. (Cl. 18—58)

This invention concerns improvements in or relating to the lining of rubber articles.

The object of the present invention is to provide a method which permits rubber articles, as for example rubber gloves, having a lining of finely divided fibre to be economically and satisfactorily produced.

According to the present invention the method for the production of rubber articles, as for example rubber gloves, provided with a lining of finely divided fibres, comprises providing a former with a viscous film of a coagulant for rubber latex, applying finely divided fibre to the said film, and thereafter depositing thereon a layer of rubber of the desired thickness from aqueous dispersions of the kinds hereinafter specified.

The viscous film of coagulant is preferably formed on the former by coating it as by dipping or spraying with a solution of a coagulant, preferably in a volatile organic solvent, and evaporating at least part of said solvent. The coagulant can be, for example, calcium chloride, calcium nitrate or zinc chloride. The volatile solvent may be, for example, alcohol or acetone. It is also desirable that the solution of coagulant should contain glycerine or ethylene glycol so as to keep the film of coagulant evenly distributed on the former and also to act as a softener for the finely divided fibre. The solution of coagulant should also preferably contain a small quantity of acetic acid to prevent hydrolysis of the calcium or zinc salt.

The finely divided fibre can be, for example, finely divided cotton, artificial silk or wool, and the fibre can be applied by spraying.

The layer of rubber of the desired thickness can be formed by dipping and/or spraying operations. Single or multiple layers of rubber can be deposited. For example, a layer of rubber can be first deposited of the same colour as the finely divided fibre, while the subsequent layer or layers can be of a contrasting colour.

The following example illustrates how the method can be effected:

A glove former is dipped into an adhesive coagulating solution of the following composition:

| | Parts by weight |
|---|---|
| Commercial ethyl alcohol | 61.5 |
| Calcium chloride | 32.5 |
| Glycerine | 5.0 |
| Glacial acetic acid | 1.0 |

Any surplus is allowed to drain off, and the former is allowed to stand for 5 minutes to enable the solvent to evaporate. White cotton flock is then sprayed by means of a spray gun on to the former coated with the adhesive coagulant. The thus coated former is then dipped slowly into a white latex mixing of the following composition:

| | Parts by weight |
|---|---|
| Rubber | 100.0 |
| Zinc oxide | 2.0 |
| Sulphur | 2.0 |
| Accelerator (mercaptobenzthiazole) | 0.5 |
| Antioxidant (2-mercaptobenzimideazole) | 0.5 |
| Paraffin wax | 2.0 |
| Titanium dioxide | 15.0 |
| Lithopone | 35.0 |

The former is then withdrawn slowly and allowed to drain. The deposit is then allowed paritally to dry out and complete coagulation takes place.

The former, with the white rubber deposit thereon, is now dipped into a latex mixing of the following composition:

| | Parts by weight |
|---|---|
| Rubber | 100.0 |
| Zinc oxide | 2.0 |
| Sulphur | 2.0 |
| Accelerator (mercaptobenzthiazole) | 0.5 |
| Antioxidant (2-mercaptobenzimideazole) | 0.5 |
| Red pigment | 1.375 |

The red latex deposit obtained is now coagulated by dipping into a solution of formic acid. The rubber glove thus formed is then washed, dried and vulcanised.

The dispersions comprise those consisting of or containing rubber, gutta-percha, balata or similar vegetable resins occurring naturally or artificially obtained.

Such artificial aqueous dispersions may include those of coagulated rubber, vulcanised rubber, synthetic rubber, or other plastics, waste or reclaim. Aqueous dispersions of vulcanised latices can also be employed. If desired, any of the aforementioned dispersions may be used alone or in admixture with one another. Dispersions of any of the above materials, with or without compounding and vulcanizing materials, are commonly designated herein as "dispersions of rubber."

Any of the aforesaid dispersions may contain the usual known compounding ingredients and/or may be in concentrated form.

Concentrates such as are obtained in British Patent Specifications Numbers 290,313 (U. S. Patent 1,846,164) and 219,635 (U. S. Serial No.

727,530—22/7/24) to which may be added any one or more of the usual compounding ingredients, may also be used.

In the accompanying drawing, there are illustrated various steps in the process embodying the invention, in which Fig. 1 shows a former coated with a coagulant which has been covered with flock or fibrous material in preparation for dipping into an aqueous dispersion of rubber, parts of the former and its coatings being shown broken away to show the relative positions. Fig. 2 is a diagrammatic view on a smaller scale of the former prepared as shown in Fig. 1, being dipped into an aqueous dispersion. Fig. 3 is a view of a glove made according to the invention on the former of Fig. 1, a part of the glove being broken away to show the fibrous inner surface. Fig. 4 is a section on a larger scale of the former and its coating taken on the line 4—4 of Fig. 1. Fig. 5 is a similar view showing the former and a layer of rubber being formed thereon during the dipping operation of Fig. 2, and Fig. 6 is a sectional view on the line 6—6 of Fig. 3, showing the position taken by the rubber and the fibrous material at the end of the dipping operation.

Referring more particularly to Figs. 1 and 2, a hollow former 10 is coated with a viscous coagulant 11 of the type described above and is then dusted or covered with fine fibrous flock 12. The former thus coated and prepared is then dipped into an aqueous dispersion 13 as shown in Fig. 2.

Prior to dipping the former into the bath 13, the surface of the former 10 will have been covered by the layer 11 of viscous coagulant in which the individual fibers 14 of the flock are more or less embedded. As shown in Fig. 4, the flock has short end portions that may project above the surface of the coagulant. However, the coagulant might in some cases completely embed or immerse the fibers of the flock. In any event, when the former and its coatings are dipped into the dispersion, the coagulant material which is generally an acid or salt solution, reacts with the alkali of the dispersion, or is absorbed in the dispersion. As a result, the projecting ends of the fibers 14 will immediately be embedded by a rubber deposit 15 and the rubber will then encroach on the coagulant, as indicated in Fig. 5, absorbing the latter until coagulation is complete. At this time the coagulant may be very largely or even completely absorbed in the rubber deposit. The flock will accordingly be embedded very nearly to its free ends as shown in Fig. 6, giving a surface 16, having a surface effect of very fine felt, suede or velvet. It will be obvious that it is not necessary that the fibers project to any substantial extent above the surface of the coagulant on the former about to be dipped.

A rubber deposit having been formed on the former it may be stripped therefrom and turned inside out so that the fibrous surface 16 will be the inner surface of the glove, as indicated in Fig. 3.

What we claim is:

1. A method for the production of rubber articles, as for example rubber gloves, provided with a lining of finely divided fibres which comprises providing a former with a viscous film of a coagulant for rubber latex, applying finely divided fibre to the said film, and thereafter depositing thereon a layer of rubber of the desired thickness from aqueous dispersions of rubber.

2. A method as claimed in claim 1 wherein the viscous film of a coagulant is formed on the former by coating it with a solution of a coagulant in a volatile organic solvent and evaporating at least part of said solvent.

3. A method as claimed in claim 1 wherein the film comprises a solution of coagulant selected from the group consisting of calcium chloride, calcium nitrate and zinc chloride.

4. A method as claimed in claim 1 wherein the film of coagulant contains a small quantity of acetic acid.

5. A method for the production of fibrous lined rubber articles which comprises coating a former with a viscous coagulating film, blowing finely divided fibers onto said film and thereafter bringing said former into contact with an aqueous dispersion of rubber.

6. A method of producing fibrous lined rubber articles which comprises coating a former with a viscous film of a coagulant dissolved in a volatile organic solvent, bringing loose fibers into contact with said film to cause said fibers to adhere thereto and then bringing the thus coated former into contact with an aqueous dispersion of rubber to deposit a layer of rubber thereon and in engagement with said fibers.

7. A method for the production of fibrous lined rubber articles which comprises coating a former with a viscous coagulating film comprising a polyhydric alcohol selected from the group consisting of glycerine and ethyl glycol, blowing finely divided fibers onto said film and thereafter bringing said former into contact with an aqueous dispersion of rubber.

8. The method of claim 7 in which said coagulant contains a small quantity of acetic acid.

JOHN ROGERSON.
FREDRICK WILLIAM WARREN.